United States Patent
Tian et al.

(10) Patent No.: US 10,220,699 B1
(45) Date of Patent: Mar. 5, 2019

(54) HEAT EXCHANGER INCLUDING ACTIVE GRILLE SHUTTERS

(71) Applicant: DENSO International America, Inc., Southfield, MI (US)

(72) Inventors: Yilin Tian, Farmington, MI (US); Nicholas Wilson, Grosse Pointe Woods, MI (US); Justin Harris, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/940,053

(22) Filed: Mar. 29, 2018

(51) Int. Cl.
*B60K 11/08* (2006.01)
*B60K 13/06* (2006.01)

(52) U.S. Cl.
CPC ............ *B60K 11/085* (2013.01); *B60K 13/06* (2013.01)

(58) Field of Classification Search
CPC ............................ B60K 11/085; B60K 13/06
See application file for complete search history.

(56) References Cited

U.S. PATENT DOCUMENTS

| | | | |
|---|---|---|---|
| 8,443,921 B2 * | 5/2013 | Charnesky | F01P 7/10 180/68.1 |
| 8,833,313 B2 | 9/2014 | Lockwood et al. | |
| 8,892,314 B2 | 11/2014 | Charnesky et al. | |
| 9,409,474 B2 | 8/2016 | Macfarlane et al. | |
| 10,100,707 B2 * | 10/2018 | Wolf | F01P 7/10 |
| 2008/0133090 A1 * | 6/2008 | Browne | B60K 11/085 701/49 |
| 2010/0147611 A1 * | 6/2010 | Amano | B60K 6/365 180/68.1 |
| 2012/0019025 A1 * | 1/2012 | Evans | B60K 11/085 296/193.1 |
| 2013/0075172 A1 * | 3/2013 | Hori | B60K 11/085 180/68.1 |
| 2013/0081888 A1 * | 4/2013 | Charnesky | B60K 11/04 180/68.3 |
| 2013/0095740 A1 | 4/2013 | Hori | |
| 2013/0264047 A1 | 10/2013 | Charnesky et al. | |
| 2013/0264133 A1 * | 10/2013 | Remy | B60K 11/085 180/68.1 |
| 2015/0197147 A1 * | 7/2015 | Koh | H02K 3/28 180/68.1 |
| 2016/0129778 A1 * | 5/2016 | Jeong | B62D 25/085 180/68.1 |
| 2016/0368366 A1 * | 12/2016 | Miller | B60K 11/085 |
| 2016/0368367 A1 * | 12/2016 | Schoning | B60R 19/48 |
| 2017/0210221 A1 | 7/2017 | Ogura et al. | |
| 2017/0225560 A1 | 8/2017 | Klop | |
| 2017/0248066 A1 * | 8/2017 | Wolf | B60K 11/085 |

FOREIGN PATENT DOCUMENTS

JP     S5992368 U     6/1984

* cited by examiner

*Primary Examiner* — Erez Gurari
(74) *Attorney, Agent, or Firm* — Harness, Dickey & Pierce, P.L.C.

(57) ABSTRACT

A combined heat exchanger and active grille shutter assembly. The assembly includes a rotatable shutter and an actuator configured to rotate the shutter. A conduit of the shutter is configured to accommodate flow of fluid therethrough and permit heat transfer between the fluid and air about the shutter. An inlet and an outlet are in fluid communication with the conduit.

20 Claims, 5 Drawing Sheets

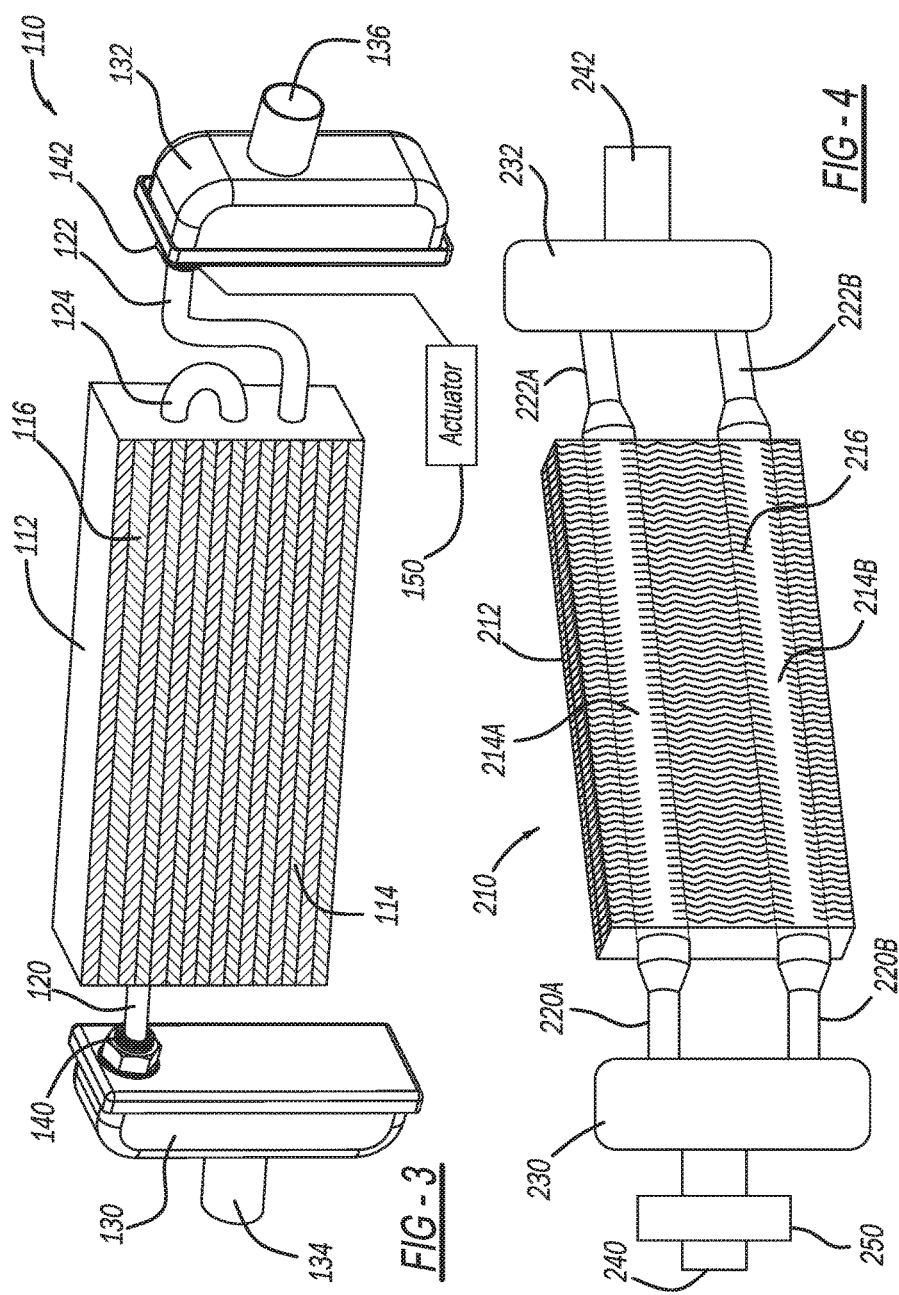

HEAT EXCHANGER INCLUDING ACTIVE GRILLE SHUTTERS

FIELD

The present disclosure relates to a combined heat exchanger and active grille shutter assembly, such as for a vehicle.

BACKGROUND

This section provides background information related to the present disclosure, which is not necessarily prior art.

Active grille shutters are used in vehicles to improve fuel economy, such as by reducing drag. When the active grille shutters are closed, however, the amount of airflow through the engine cooling module is undesirably reduced. A system that allows a heat exchanger of an engine cooling module to receive an adequate amount of fresh airflow regardless of whether the active grille shutters are open or closed would therefore be desirable. The present disclosure advantageously provides for a combined heat exchanger and active grille shutter assembly that addresses these issues in the art, as well as numerous other issues as explained in detail herein and as one skilled in the art will appreciate.

SUMMARY

This section provides a general summary of the disclosure, and is not a comprehensive disclosure of its full scope or all of its features.

The present disclosure includes a combined heat exchanger and active grille shutter assembly. The assembly includes a rotatable shutter and an actuator configured to rotate the shutter. A conduit of the shutter is configured to accommodate flow of fluid therethrough and permit heat transfer between the fluid and air about the shutter. An inlet and an outlet are in fluid communication with the conduit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 illustrates another combined heat exchanger and active grille shutter assembly in accordance with the present disclosure;

FIG. 4 illustrates an additional combined heat exchanger and active grille shutter assembly in accordance with the present disclosure;

Corresponding reference numerals indicate corresponding parts throughout the several views of the drawings.

DETAILED DESCRIPTION

Example embodiments will now be described more fully with reference to the accompanying drawings.

Figure 1:
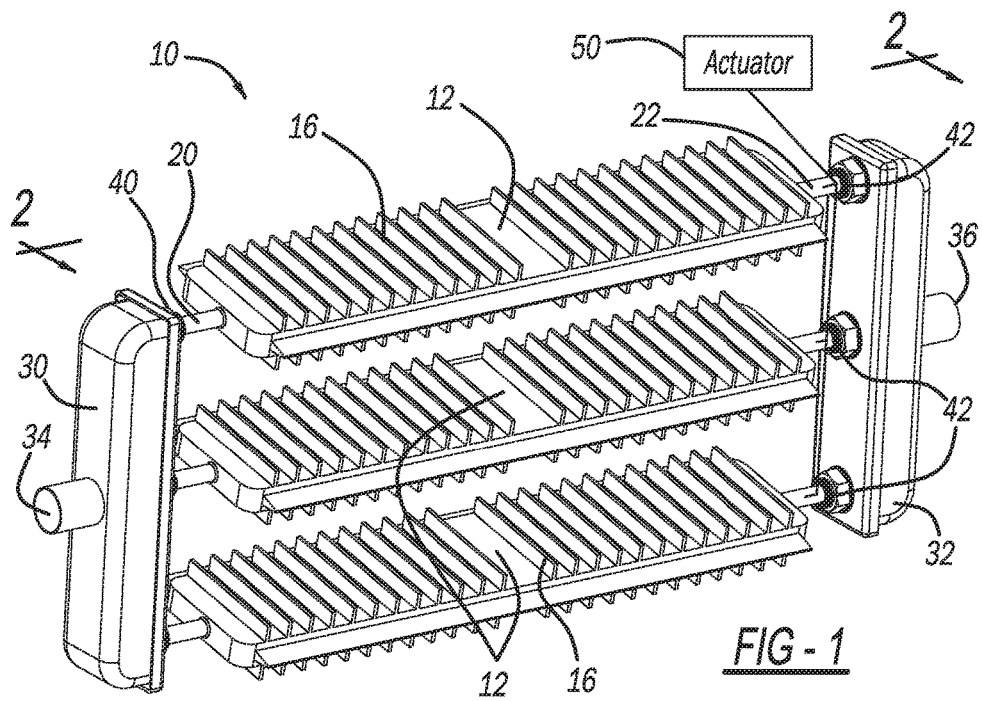
FIG. 1 is a perspective view of a combined heat exchanger and active grille shutter assembly in accordance with the present disclosure.
Figure 2:
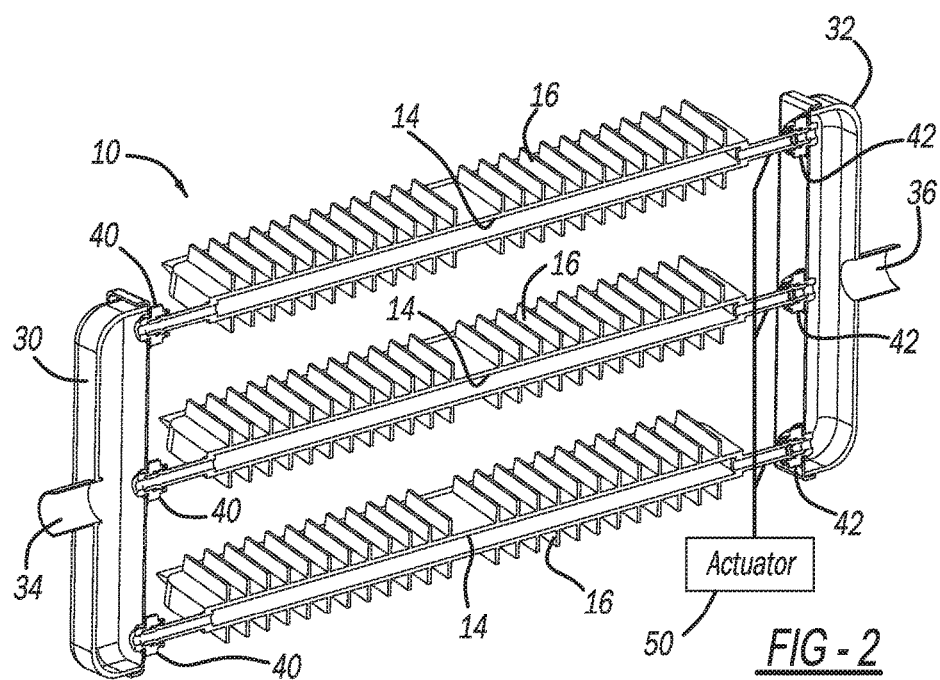
FIG. 2 is a cross-sectional view taken along line 2-2 of FIG. 1.

With initial reference to FIGS. 1 and 2, a combined heat exchanger and active grille shutter assembly in accordance with the present disclosure is generally illustrated at reference numeral 10. The assembly 10 can be configured for cooling any suitable fluid (including air) circulated therethrough, such as engine coolant of any suitable vehicle. The assembly 10, as well as any of the other assemblies described herein, may also be configured for oil cooling, such as transmission oil, engine oil, power steering oil, and any other automotive oil in need of being temperature controlled (heat from the oil will be rejected to the air about the assembly 10 by shutters 12 and fins 16, for example). The assembly 10, as well as any of the other assemblies described herein, may also be configured as a low temperature radiator in which heat of coolant from a source will be rejected to the outside air passing across the shutters 12, such as a water charge air cooler, exhaust gas recirculation system cooler, or battery cooler. The assembly 10, as well as any of the other assemblies described herein, may further be configured as an outside heat exchanger for a conventional AC system (air cooled condenser), heat pump for an electric car (switching between heater and cooler for refrigerant), and battery cooling applications with a chiller. Still further, the assembly 10, as well as any of the other assemblies described herein, may be configured as an air to air charge air cooler.

The assembly 10 generally includes one or more vehicle active grille shutters 12, which may be opened or closed (or arranged at any suitable point therebetween) to improve fuel economy, such as by reducing drag. The active grille shutters 12 may be configured as plate shutters as illustrated, or as any other suitable active grille shutters for a vehicle. The assembly 10 may include any suitable number of shutters 12, such as three as illustrated. At least one of the shutters 12 defines a conduit 14, as illustrated in FIG. 2. The conduits 14 are configured to accommodate flow of fluid therethrough, and permit heat transfer between the fluid and air about the shutters 12. In some applications, the assembly 10 (or any of the other assemblies 110, 210, 310, 410, and 510 described herein) may be configured such that one or more of the active grille shutters 12 does not include the conduit 14, and thus is not configured as a heat exchanger.

The shutters thus also advantageously act as heat exchangers. Providing the shutters 12 with heat exchanger functionality advantageously eliminates the need for a separate heat exchanger spaced apart from the active grille shutters 12, thereby saving space, such as space at a front of the vehicle. To facilitate heat transfer, the shutters 12 may include a plurality of fins 16. The fins 16 may extend from an exterior of the shutters 12 as illustrated, and/or may extend into the conduits 14.

Fluid is directed to the conduits 14 by inlets 20, which may be inlet tubes. Fluid flowing from the conduits 14 is directed away from the conduits 14 by outlets 22, which may be outlet tubes. Each one of the inlet tubes 20 may extend from an inlet tank 30, which receives the fluid to be cooled by way of tank inlet 34. Each one of the outlet tubes 22 may extend to an outlet tank 32, which collects the fluid. The fluid exits the outlet tank 32 through tank outlet 36.

At an interface between the inlet tubes 20 and the inlet tank 30 are inlet linkages 40. Similarly, at an interface between the outlet tubes 22 and the outlet tank 32 are outlet linkages 42. The inlet linkages 40 and the outlet linkages 42 advantageously allow the inlet tubes 20 to rotate relative to the inlet tank 30 while maintaining a fluid tight seal therebetween. The outlet linkages 42 advantageously maintain a fluid tight seal between the outlet tubes 22 and the outlet tank 32, while allowing the outlet tubes 22 to rotate relative to the outlet tank 32.

Figure 13:
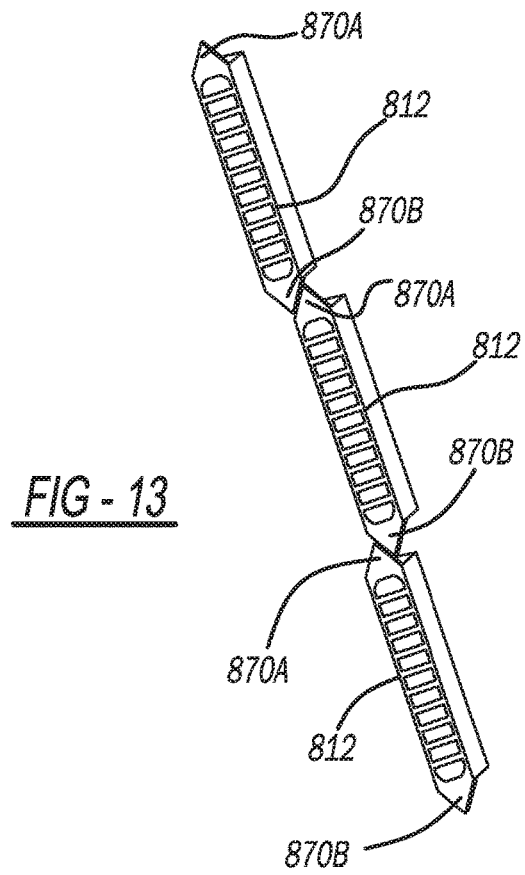
FIG. 13 illustrates a plurality of shutters in accordance with the present disclosure in a closed configuration, and cooperation between the shutters to restrict airflow.

The assembly 10 further includes an actuator 50. The actuator 50 is any device suitable for rotatably actuating the shutters 12 to operate the shutters 12 as vehicle active grille shutters. The actuator 50 may be connected to the inlet tubes 20, the outlet tubes 22, the shutters 12, or any other suitable portion of the assembly 10 in order to rotate the shutters 12. The actuator 50 rotates the shutters 12 to any suitable position, such as an open position as illustrated in FIGS. 1 and 2, in which gaps are defined between the shutters 12 to permit airflow between and across the shutters 12, and through the assembly 10. The actuator 50 is also configured to rotate the shutters 12 to a closed position in which no gaps are defined between the shutters 12 because the shutters 12 abut one another, as illustrated in FIG. 13 for example. The actuator 50 is further configured to rotate the shutters 12 to any suitable intermediate positions between the open and closed positions. Regardless of whether the shutters 12 have been rotated by the actuator 50 to the closed position, open position, or an intermediate position, airflow (such as RAM air) flowing to the shutters 12 will facilitate heat dissipation from fluid flowing through the conduits 14 of the shutters 12.

FIG. 3 illustrates another combined heat exchanger and active grille shutter assembly 10 in accordance with the present disclosure at reference numeral 110. The features of the assembly 110 in common with the assembly 10 are designated in FIG. 3 with the same reference numerals, but increased by 100. The description of the common features set forth above in the description of the assembly 10 also applies to the assembly 110. Unlike the assembly 10, the assembly 110 includes a shutter 112 with multi-pass conduits 114 extending back and forth across the shutter 112. An intermediate tube 124 connects neighboring conduits 114, thus allowing fluid flowing through the conduits 114 to cycle back and forth across the shutter 112. Although FIG. 3 illustrates only a single shutter 112 between the tanks 130 and 132, any suitable number of additional shutters 112 may be included. The actuator 150 may be configured in any suitable manner to rotate the shutter 112. For example and as illustrated, the actuator 150 may be coupled to the outlet linkage 142 to rotate the shutter 112. The actuator 150 may alternatively be coupled to the inlet linkage 140, or at any other location suitable for rotating the shutter 112.

FIG. 4 illustrates an additional combined heat exchanger and active grille shutter assembly in accordance with the present teachings at reference numeral 210. The assembly 210 is similar to the assembly 10, and thus similar features are illustrated with the same reference numerals, but increased by 200. The description of the similar features set forth above in the description of the assembly 10 also applies to the assembly 210. Unlike the assembly 10, the actuator 250 is coupled to the inlet linkage 240 (or the outlet linkage 242) to rotate the inlet tank 230 and the outlet tank 232 along with the shutter 212. Further, the shutter 212 includes a first conduit 214A and a second conduit 214B, each of which receive fluid flowing from the inlet tank 230 to the outlet tank 232. Specifically, first inlet tube 220A connects the inlet tank 230 to the first conduit 214A, and first outlet tube 222A connects the first conduit 214A to the outlet tank 232. A second inlet tube 220B connects the inlet tank 230 to the second conduit 214B, and a second outlet tube 222B connects the second conduit 214B to the outlet tank 232. Although the assembly 210 only illustrates a single shutter 212, the assembly 210 may include any suitable number of shutters 212, which are rotatable to open positions in which gaps are defined between the shutters 212, to closed positions in which no gaps are defined, or to any suitable intermediate positions. The shutters 212 (which act as heat exchangers) can be used for different cooling purposes, or to work in parallel/series to cool the same fluid.

Figure 5:
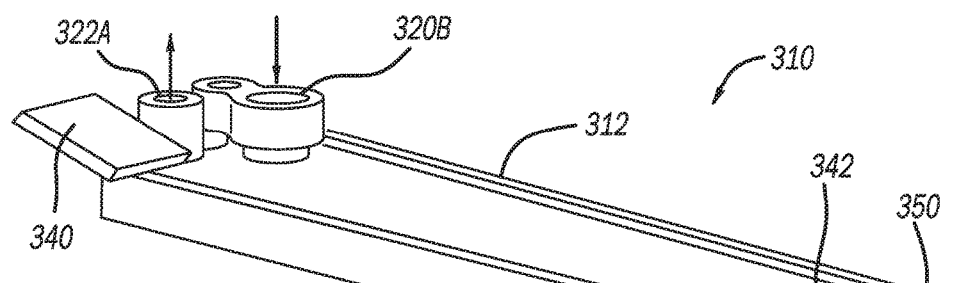
FIG. 5 illustrates yet another combined heat exchanger and active grille shutter assembly in accordance with the present disclosure.

With reference to FIG. 5, another assembly in accordance with the present disclosure is illustrated at reference numeral 310. The features of the assembly 310 that are similar to features of the assembly 10 are illustrated in FIG. 5 with similar reference numerals, but increased by 300. The description of the similar features set forth above in the description of the assembly 10 also applies to the assembly 310. The actuator 350 is coupled to the first linkage 340 or the second linkage 342 (as illustrated) in order to rotate the shutter 312. The assembly 310 can include any suitable number of shutters 312. The actuator 350 can be configured to rotate each one of the shutters 312. The shutter 312 includes a first inlet 320A, which defines a passage to a first conduit of the shutter 312. The first conduit extends from the first inlet 320A to the first outlet 322A. A second inlet 320B provides an inlet passage to a second conduit of the shutter 312, which extends to a second outlet 322B. The first and second conduits can be used to cool different fluids, or can work in parallel/series to cool the same component.

Figure 6:
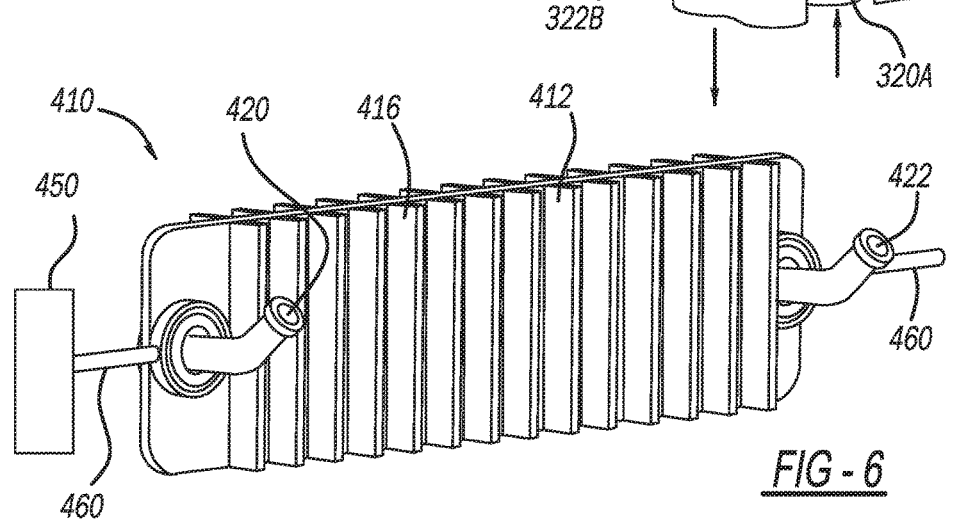
FIG. 6 illustrates a further combined heat exchanger and active grille shutter assembly in accordance with the present disclosure.
Figure 7:
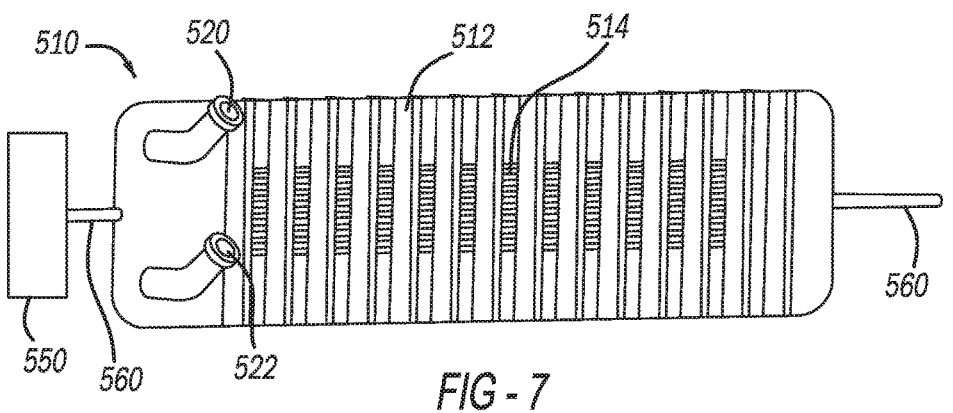
FIG. 7 illustrates still another combined heat exchanger and active grille shutter assembly in accordance with the present disclosure.

FIG. 6 illustrates another combined heat exchanger and active grille shutter assembly in accordance with the present disclosure at reference numeral 410. The features of the assembly 410 that are similar to features of the assembly 10 are illustrated in FIG. 6 with similar reference numerals, but increased by 400. The description of the similar features set forth above in the description of the assembly 10 also applies to the assembly 410. The assembly 410 includes a pair of support members 460, one or both of which is connected to the actuator 450 for rotation of the shutter 412. Although the assembly 410 illustrates only a single shutter 412, the assembly 410 can include any suitable number of shutters 412, such as two or more shutters 412. The inlet 420 and the outlet 422 can be provided as individual ports at the ends of flexible hoses attached to the shutter 412. The inlet 420 and the outlet 422 can be arranged at opposite ends of the shutter 412 as illustrated, with one or more conduits (similar to the conduit 14) extending therebetween. Alternatively, and as illustrated in FIG. 7 in conjunction with the assembly 510, inlet 520 and outlet 522 may be arranged at the same end of the shutter 512. Conduits 514 extend from the inlet 520, back and forth across the shutter 512, and to the outlet 522 to facilitate heat transfer between fluid flowing through the conduits 514 and surrounding airflow.

Figure 8A:
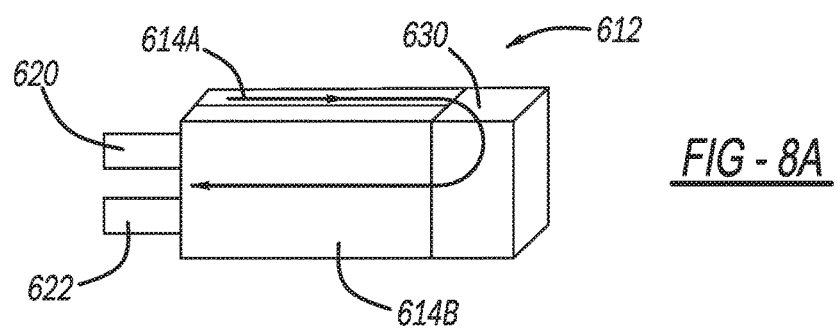
FIG. 8A illustrates an exemplary shutter for use with a combined heat exchanger and active grille shutter assembly in accordance with the present disclosure.
Figure 8B:
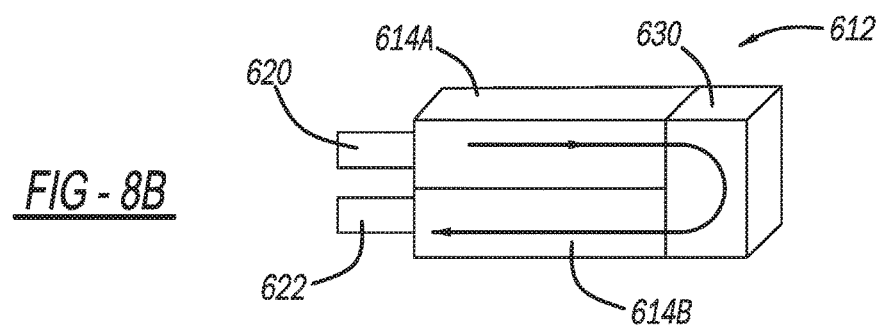
FIG. 8B illustrates another exemplary shutter for use with a combined heat exchanger and active grille shutter assembly in accordance with the present disclosure.

With reference to FIG. 8A, another shutter in accordance with the present disclosure is illustrated at reference numeral 612. The shutter 612 can be included with any of the combined heat exchanger and active grille shutter assemblies 10, 110, 210, 310, 410, 510, etc. of the present teachings. Inlet 620 of the shutter 612 provides passage to first conduit 614A, which is in fluid communication with tank 630. Second conduit 614B is also in fluid communication with the tank 630, and outlet 622 provides an outlet of the second conduit 614B. Thus the shutter 612 advantageously provides front to back flow of fluid, which in many applications will facilitate heat transfer from the fluid to airflow about the shutter 612. With reference to FIG. 8B, the shutter 612 can be alternatively arranged to provide top to bottom flow of fluid.

Figure 9:
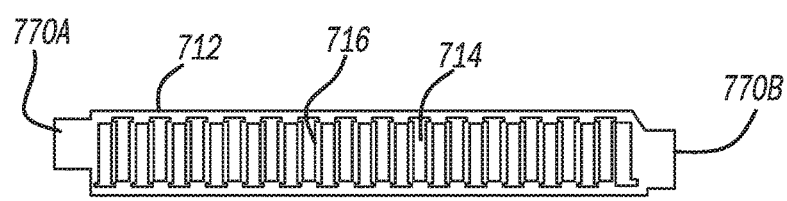
FIG. 9 illustrates another shutter in accordance with the present disclosure.

FIG. 9 illustrates another shutter in accordance with the present disclosure at reference numeral 712. The shutter 712 can be used with any of the combined heat exchanger and active grille shutter assemblies of the present disclosure, such as the assemblies 10-510. The shutter 712 can be formed in any suitable manner, such as by brazing with brazed inner fins 716 arranged within the conduit 714. The fins 716 advantageously facilitate heat transfer from fluid flowing through the conduit 714. The shutter 712 includes wings 770A and 770B at opposite ends thereof. When a plurality of the shutters 712 are in a closed position, the wings 770A and 770B will cooperate with wings of neighboring shutters to eliminate any gaps between the shutters 712 and restrict airflow past the shutters 712.

Figure 10:
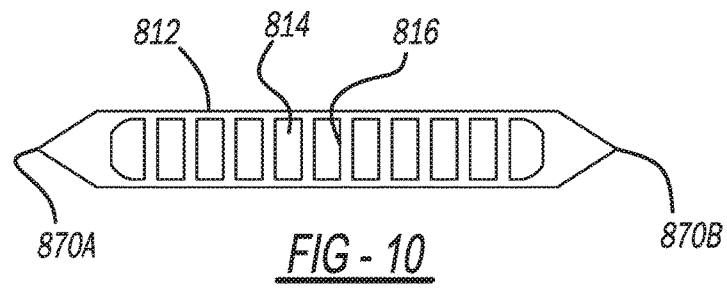
FIG. 10 illustrates still another shutter in accordance with the present disclosure.

With reference to FIG. 10, the present disclosure provides for an additional shutter 812. One or more of the shutters 812 can be included with any of the combined heat exchanger and active grille shutter assemblies of the present teachings, such as any of the assemblies 10-510. The shutter 812 can be formed from an extruded tube, which defines fins 816 within conduit 814. Like the shutter 712, the shutter 812 can include a first wing 870A and a second wing 870B. As illustrated in FIG. 13, when a plurality of the shutters 812 are arranged in a closed position, the wings 870A and 870B of neighboring shutters cooperate with one another to restrict airflow from flowing across the shutters 812.

Figure 11:
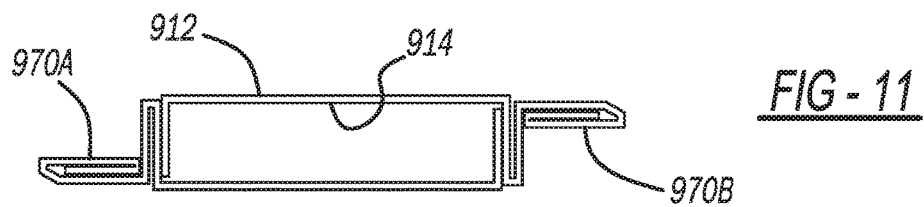
FIG. 11 illustrates an additional shutter in accordance with the present disclosure.
Figure 12:
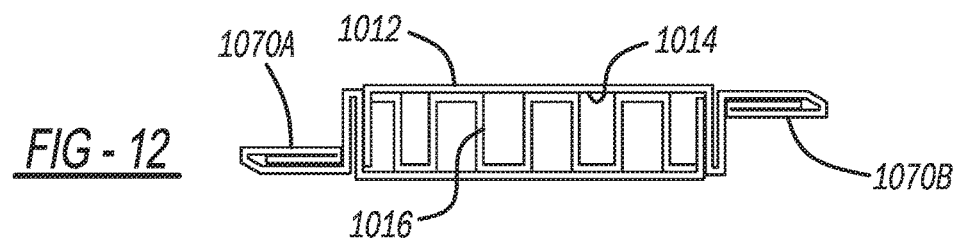
FIG. 12 illustrates yet another shutter in accordance with the present disclosure.

FIG. 11 illustrates another shutter in accordance with the present disclosure at reference numeral 912. One or more of the shutters 912 can be included with any of the combined heat exchanger and active grille shutter assemblies according to the present disclosure, such as any of the assemblies 10-510. The shutter 912 is formed as a brazed tube defining the conduit 914. Like the shutters 712 and 812, the shutter 912 includes a first wing 970A and a second wing 970B. With reference to FIG. 12, another brazed shutter is illustrated at reference numeral 1012. The shutter 1012 is similar to the shutter 912, but brazed with inner fins 1016, which facilitate heat transfer from fluid flowing through the conduit 1014 to airflow about the shutter 1012. Like the shutters 712, 812, and 912, the shutter 1012 includes a first wing 1070A and a second wing 1070B.

The present disclosure thus advantageously provides for various combined heat exchanger and active grille shutter assemblies, such as the assemblies 10, 110, 210, 310, 410, and 510. The assemblies advantageously include active grille shutters (such as shutters 12, 112, 212, 312, 412, 512, 612, 712, 812, 912, and 1012) with heat exchanger functionality. Specifically, the shutters 12-1012 each include conduits configured to accommodate fluid flow therethrough, which allows for the release of heat from the fluid to airflow about the shutters regardless of whether the shutters are open or closed. The present disclose advantageously eliminates the need for separate active grille shutters and heat exchangers, thereby advantageously saving space, such as at a front of a vehicle. The present disclosure provides numerous additional advantages and unexpected results over the prior art, as one skilled in the art will appreciate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A combined heat exchanger and active grille shutter assembly comprising:
    a rotatable shutter;
    an actuator configured to rotate the shutter;
    a conduit of the shutter configured to accommodate flow of fluid therethrough and permit heat transfer between the fluid and air about the shutter;
    an inlet in fluid communication with the conduit through which fluid enters the conduit; and
    an outlet in fluid communication with the conduit through which fluid exits the conduit.

2. The assembly of claim 1, wherein the rotatable shutter is one of a plurality of rotatable shutters movable from at least one open position in which a gap is defined between the plurality of rotatable shutters, and a closed position in which no gap is defined between the plurality of rotatable shutters; and
    wherein the assembly includes at least one active grill shutter that is without the conduit.

3. The assembly of claim 1, wherein the rotatable shutter includes a plurality of fins configured to facilitate heat transfer.

4. The assembly of claim 3, wherein the fins are at an exterior of the rotatable shutter.

5. The assembly of claim 3, wherein the fins extend outward from the rotatable shutter.

6. The assembly of claim 3, wherein the fins are at an interior of the conduit.

7. The assembly of claim 1, further comprising an inlet tank and an outlet tank;
    wherein the inlet includes an inlet tube connecting the inlet tank to the rotatable shutter, and the outlet includes an outlet tube connecting the outlet tank to the rotatable shutter.

8. The assembly of claim 7, wherein the actuator is further configured to rotate the inlet tank and the outlet tank with the rotatable shutter.

9. The assembly of claim 1, wherein the conduit is a multi-passage conduit.

10. The assembly of claim 1, wherein the inlet is a first inlet and the outlet is a first outlet of the conduit, which is a first conduit;
    wherein the assembly further includes a second inlet and a second outlet of a second conduit; and
    wherein the first conduit and the second conduit are arranged to permit heat transfer between fluid flowing through the first conduit and fluid flowing through the second conduit.

11. The assembly of claim 1, wherein the conduit is a first conduit of the rotatable shutter;
    wherein the assembly further includes a second conduit that is opposite to the first conduit;
    wherein the inlet is an inlet of the first conduit and the outlet is an outlet of the second conduit; and
    wherein a tank is between, and connects, the first conduit and the second conduit.

12. The assembly of claim 1, wherein the conduit is defined by an extruded tube.

13. The assembly of claim 1, wherein the conduit is defined by a brazed tube.

14. The assembly of claim 13, wherein the brazed tube includes wings that overlap with wings of neighboring rotatable shutters to restrict airflow past the assembly.

15. The assembly of claim 1, wherein the fluid is one of air, refrigerant, coolant, water, oil, transmission oil, engine oil, and power steering oil.

16. A combined heat exchanger and active grille shutter assembly for a vehicle comprising:
    a plurality of shutters each rotatable to at least one open position in which a gap is defined between neighboring ones of the plurality of shutters, and a closed position in which no gap is defined between neighboring ones of the plurality of shutters to restrict airflow across the assembly;
    an actuator configured to rotate the plurality of rotatable shutters;
    each one of the plurality of shutters defining a conduit configured to accommodate flow of fluid therethrough and permit heat transfer between the fluid and air about the plurality of shutters;
    an inlet tank in fluid communication with the conduit; and
    an outlet tank in fluid communication with the conduit.

17. The assembly of claim 16, wherein the actuator is configured to rotate the inlet tank and the outlet tank, or individual shutters.

18. The assembly of claim 16, wherein the plurality of shutters include a plurality of heat dissipating fins at at least one of an interior and exterior of the plurality of shutters.

19. The assembly of claim 16, wherein each one of the plurality of shutters includes wings that overlap with one another when the plurality of shutters are closed to restrict airflow past the assembly.

20. The assembly of claim 16, wherein the conduit of each one of the plurality of shutters is defined by a brazed tube including wings that overlap with wings of neighboring rotatable shutters to restrict airflow past the assembly.

* * * * *